(12) United States Patent
Garcia et al.

(10) Patent No.: US 10,793,355 B1
(45) Date of Patent: Oct. 6, 2020

(54) INVENTORY STORAGE MODULE WITH ROBOTIC TRANSPORT SYSTEM

(71) Applicant: Amazon Technologies, Inc., Seattle, WA (US)

(72) Inventors: Benjamin Douglas Garcia, Seattle, WA (US); Martin Peter Aalund, Seattle, WA (US); Jon Stuart Battles, North Bend, WA (US); William Kalm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 183 days.

(21) Appl. No.: 15/947,524

(22) Filed: Apr. 6, 2018

(51) Int. Cl.
*B65G 1/00* (2006.01)
*B65G 1/137* (2006.01)
*B25J 9/00* (2006.01)
*B25J 15/06* (2006.01)
*B25J 9/16* (2006.01)
*B65G 1/06* (2006.01)
*G06Q 10/08* (2012.01)
*B25J 5/02* (2006.01)
*G06Q 50/28* (2012.01)

(52) U.S. Cl.
CPC .............. *B65G 1/1373* (2013.01); *B25J 5/02* (2013.01); *B25J 9/0096* (2013.01); *B25J 9/162* (2013.01); *B25J 9/1664* (2013.01); *B25J 15/0616* (2013.01); *B65G 1/06* (2013.01); *G06Q 10/087* (2013.01); *B65G 2209/10* (2013.01); *G06Q 50/28* (2013.01)

(58) Field of Classification Search
CPC .................................................. B65G 1/1376
See application file for complete search history.

(56) References Cited

U.S. PATENT DOCUMENTS

| 6,011,998 | A | * | 1/2000 | Lichti | B65G 1/1376 |
| | | | | | 414/268 |
| 6,626,632 | B2 | * | 9/2003 | Guenzi | B65G 1/1376 |
| | | | | | 414/789.6 |
| 8,276,739 | B2 | * | 10/2012 | Bastian, II | B65G 1/026 |
| | | | | | 198/347.1 |
| 9,315,323 | B2 | * | 4/2016 | Schubilske | G05B 15/02 |
| 2005/0008463 | A1 | * | 1/2005 | Stehr | B65G 1/1378 |
| | | | | | 414/277 |
| 2017/0057747 | A1 | * | 3/2017 | Hellenbrand | B65G 11/023 |
| 2018/0057264 | A1 | * | 3/2018 | Wicks | B65G 1/1376 |

* cited by examiner

*Primary Examiner* — Jonathan Snelting
(74) *Attorney, Agent, or Firm* — BakerHostetler

(57) ABSTRACT

In one embodiment, an inventory storage system has at least one storage module having a shelving system, a conveyor, and a robotic transport system. The shelving system has a plurality of shelves that are spaced from one another along a vertical direction and that define a plurality of inventory storage locations. The conveyor is positioned alongside the shelving system and is configured to convey inventory items along a longitudinal direction. The robotic transport system is positioned alongside the shelving system and spaced above the conveyor along the vertical direction. The robotic transport system has a track, and a trolley that translates along the track and that includes a robotic manipulator. The trolley moves the robotic manipulator along the track to a position that is adjacent a select one of the inventory storage locations so as to stow an inventory item to, or retrieve the item from, the select storage location.

11 Claims, 9 Drawing Sheets

INVENTORY STORAGE MODULE WITH ROBOTIC TRANSPORT SYSTEM

BACKGROUND

Inventory storage facilities such as warehouses and distribution centers commonly employ shelving units to hold inventory items until they are needed to fulfill a customer order. The shelving units are arranged in rows that are spaced from one another so as to define aisles between the rows of shelving units. To store an inventory item on a desired shelving unit, a human can carry the inventory item down an aisle in the warehouse to the desired shelving unit and place the inventory item on the desired shelving unit where it is stored until it is needed. When an order is placed, a human can travel down the aisle to the desired shelving unit, retrieve the inventory item from the desired shelving unit, and place the inventory item on a conveyor belt that carries the inventory item downstream for packaging and shipping.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

In inventory storage facilities, storage density is an important characteristic. Packing inventory items closer together reduces the overall volume that is needed to store the inventory items. Thus, a smaller building or structure can be used to store inventory items that are packed closer together. Further, in an existing storage facility, increasing density can free up warehouse space that can be used to store additional inventory items, thereby increasing the capacity of the storage facility. Presented herein are inventory storage modules, and storage systems that can have a higher storage density than the conventional shelving units discussed above.

Figure 1:
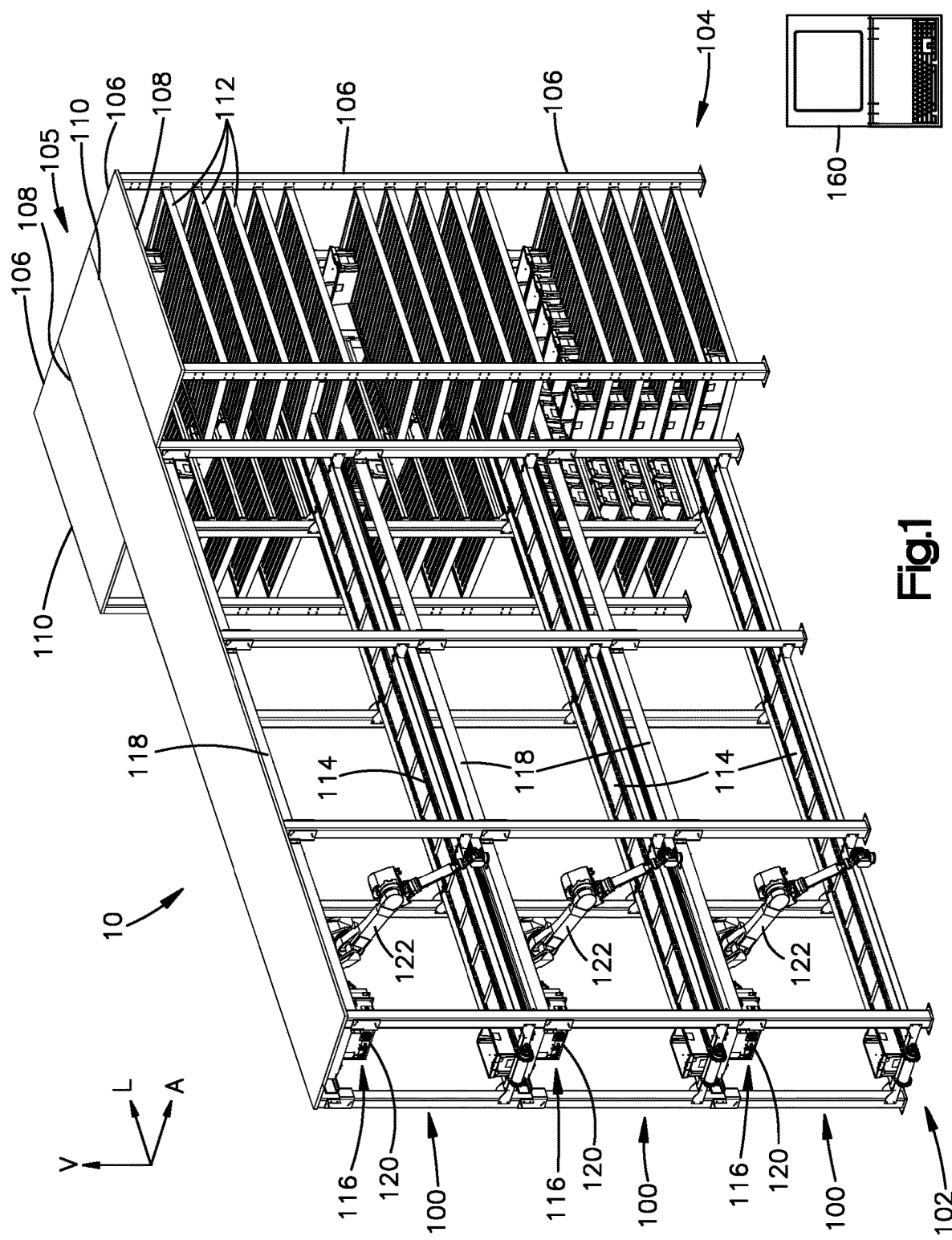
FIG. 1 shows a top perspective view of an inventory storage system according to one embodiment having a plurality of storage modules stacked on top of one another, each storage module having a pair of shelving systems, a conveyor, and a robotic transport system having a robotic manipulator, where a portion of each shelving system is hidden to show the conveyors and robotic transport systems.
Figure 2:
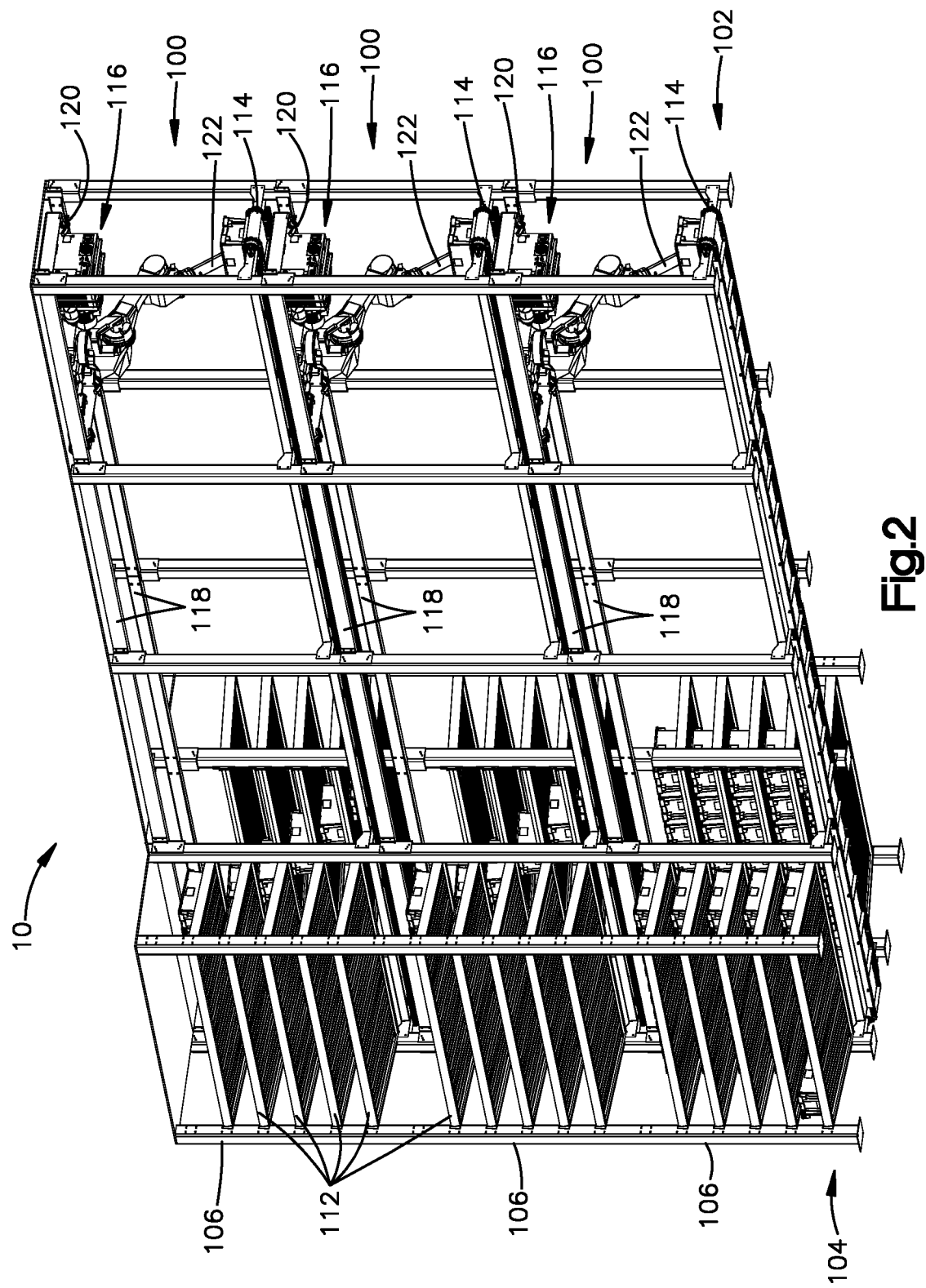
FIG. 2 shows a bottom perspective view of the storage system of FIG. 1, where a portion of each shelving system is hidden to show the conveyors and robotic transport systems.

Referring to FIGS. 1 and 2, an inventory storage system 10 according to one embodiment is shown that is configured to store inventory items. In general, the storage system 10 has at least one storage module 100. In FIGS. 1 and 2, three storage modules 100 are shown stacked on top of one another along a vertical direction V. Thus, it can be said that the storage system 10 has at least one vertical stack of storage modules 100. However, in alternative examples, the storage system 10 can have as few as one storage module 100 or more than one storage module 100. It will be understood from the following description that the height, width, and length of the system 10 can be scalable to fit within a desired volume in a warehouse space by stacking storage modules 100 on top of one another and next to one another.

The storage system 10 has a first end 102 and a second end 104 that are spaced from one another along a longitudinal direction L. Each storage module 100 extends between the first and second ends 102 and 104. Each storage module 100 comprises at least one shelving system 106 that extends between the first and second ends 102 and 104 along the longitudinal direction L. The storage system 10 defines at least one aisle 105 disposed alongside of the at least one shelving system 106 with respect to a lateral direction that is perpendicular to the longitudinal direction L. Each storage module 100 can be configured to move inventory items onto or remove inventory items from its at least one shelving system 106. In one example as shown, each storage module 100 can comprise a pair of shelving systems 106 that are spaced from one another along a lateral direction A that is perpendicular to the longitudinal direction L and the vertical direction V. In such embodiments, the aisle 105 can extend between the pair of shelving systems 106. However, in alternative embodiments, each storage module 100 can have as few as one shelving system 106.

Each shelving system 106 has a first side 108 and a second side 110 that are spaced from one another along the lateral direction A. Each shelving system 106 has at least one shelf 112, such as a plurality of shelves 112 that are spaced from one another along the vertical direction V. The at least one shelf 112 defines a plurality of inventory storage locations. Each storage location can be sized and configured to store an inventory item or a storage container 150. For example, each shelf 112 can define a plurality of storage locations that are offset from one another along the longitudinal direction L. Each shelving system 106 can have a length that is up to or equal to a length of the storage system 10 from the first end 102 to the second end 104. However, in FIGS. 1 and 2, only a portion of each shelving system 106 is shown for illustrative purposes so that components between the shelving systems 106 can be viewed. In some embodiments, each shelf 112 can be angled downwards as it extends along the lateral direction A towards the aisle 105 such that gravity draws inventory items or storage containers 150 stored on the shelf 112 towards the aisle 105.

Each storage module 100 has at least one conveyor 114 that is positioned alongside one of the first and second sides 108 and 110 of each of its shelving systems 106. For example, each conveyor 114 can be positioned along at least one of the first side 108 of one of its shelving systems 106 and the second side 110 of the other one of its shelving systems 106. Thus, each conveyor 114 can be disposed between a pair of shelving systems 106, such as in the aisle 105. As shown, the storage system 10 can have a plurality of conveyors 114 that are spaced from one another along the vertical direction V. It will be understood that, in various embodiments, the storage system 10 can have as few as one conveyor 114 or any suitable number of conveyors 114, including more than the three conveyors 114 shown.

Each conveyor 114 extends between the first end 102 and the second end 104 such that the conveyor 114 is elongate along the longitudinal direction L. Each conveyor 114 is configured to convey inventory items along the longitudinal direction L between the first end 102 and the second end 104. Each inventory item can be stored in a storage container 150 that can be carried by the conveyor 114 or can be placed directly on the conveyor 114. In either case, it can be said that the conveyor 114 conveys the inventory item. In some embodiments, each conveyor 114 can be configured to convey inventory items in a unidirectional manner such that the inventory items can be moved in only a first direction from one of the first and second ends 102 and 104 to the other of the first and second ends 102 and 104. In such embodiments, one of the first and second ends 102 and 104 can be considered to be an incoming end, and the other one of the first and second ends 102 and 104 can be considered to be an outgoing end. Alternatively, each conveyor 114 can operate in a bidirectional manner such the inventory items can be selectively conveyed in one of the first direction and a second direction, opposite the first direction.

Although not shown, the storage system 10 can include the storage module 100 and at least one conveyor system (not shown) configured to convey inventory items from processing that is upstream of the each storage module 100 to the first end 102 or from the first end 102 to processing that is downstream of the each storage module 100. Similarly, the storage system 10 can have at least one conveyor system (not shown) configured to convey inventory items from processing that is upstream of each storage module 100 to the second end 104 or from the second end 104 to processing that is downstream of each storage module 100.

Each storage module 100 has a robotic transport system 116 that is positioned alongside one of the first and second sides 108 and 110 of each shelving system 106 with respect to the lateral direction A. For example, each robotic transport system 116 can be positioned along at least one of the first side 108 of one of the shelving systems 106 and the second side 110 of the other one of the shelving systems 106. Thus, each robotic transport system 116 can be disposed between a pair of shelving systems 106, such as along the aisle 105. As shown, the storage system 10 can have a plurality of robotic transport systems 116 that are spaced from one another along the vertical direction V. It will be understood that, in various embodiments, the storage system 10 can have as few as one robotic transport system 116 or any suitable number of robotic transport systems 116, including more than the three robotic transport systems 116 shown.

The robotic transport system 116 of each storage module 100 is spaced above the conveyor 114 of the storage module 100 along the vertical direction V so as to service the the conveyor 114. Each robotic transport system 116 has a track comprising at least one rail 118 that extends between the first and second ends 102 and 104 along the longitudinal direction L, and a trolley 120 (see e.g., FIGS. 5 and 6) configured to translate along the track along the longitudinal direction L. Each trolley 120 has a robotic manipulator 122 with a robotic arm. Each trolley 120 is configured to move a respective robotic manipulator 122 along the track to a position that is adjacent a select one of the inventory storage locations. Each robotic manipulator 122 is configured to move an inventory item from at least one of (1) a respective one of the conveyors to the select one of the inventory storage locations and (2) the select one of the inventory storage locations to the respective one of the conveyors when the robotic manipulator 122 is disposed adjacent the select one of the inventory storage locations.

The operation of each storage module 100, and in particular, of the robotic transport system 116 and conveyor 114 of each storage module 100, can be controlled by a controller 160 that is external to the storage module 100. The controller 160 can communicate with a controller that is local to each storage module 100 wirelessly or via a wire. In some examples, each storage module 100 can be controlled independently of the other storage modules 100. For example, each storage module 100 can be configured to service its at least one shelving system 106 independently of the other storage modules 100 servicing their respective shelving systems 106.

Figure 3:
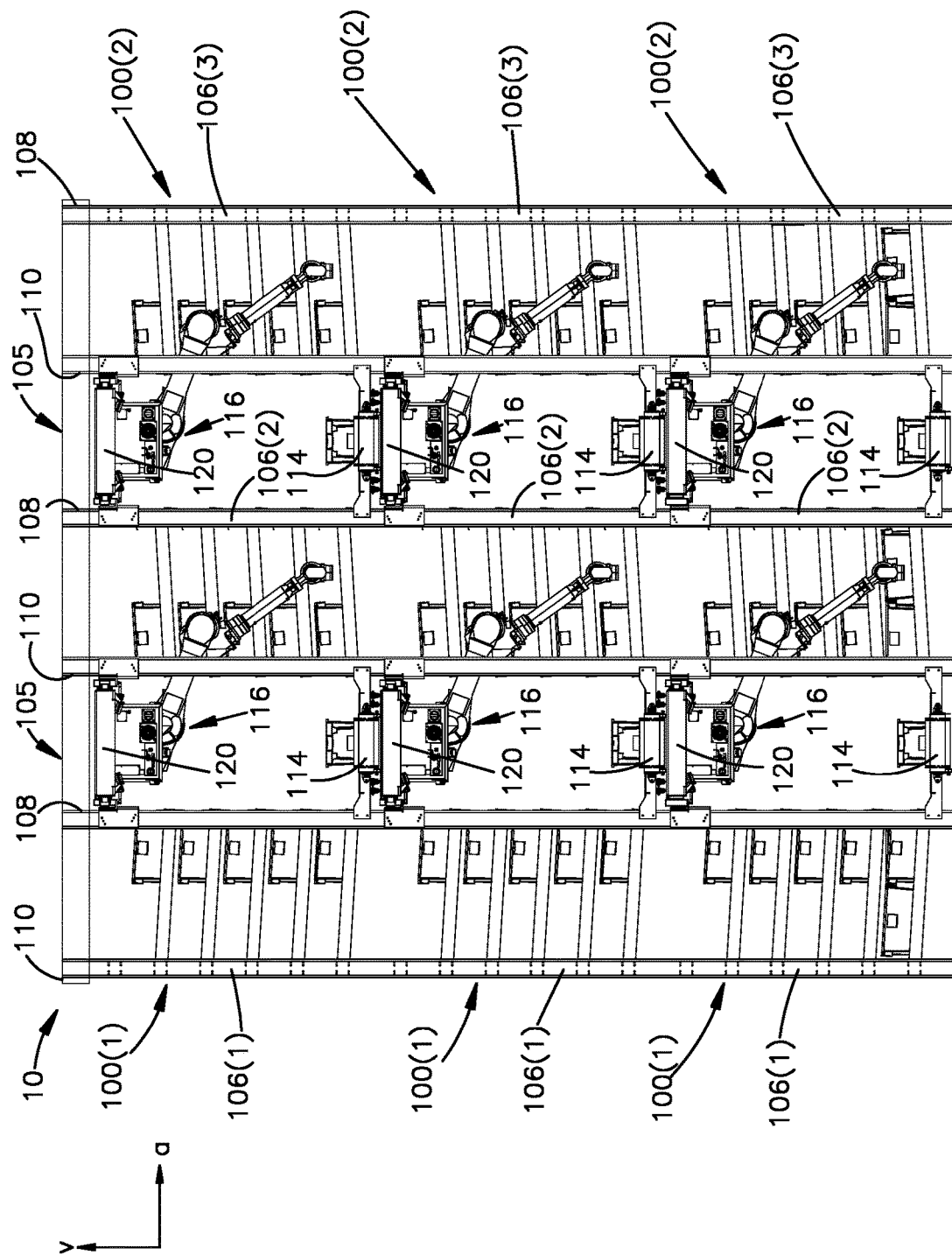
FIG. 3 shows an end view of a system having a plurality of vertical stacks of the storage modules of FIG. 1.

Turning briefly to FIG. 3, an inventory storage system 10 can include a plurality of the inventory storage modules 100 of FIGS. 1 and 2 that are positioned side-by-side along the lateral direction A. In FIG. 3, two vertical stacks of storage modules 100 are shown; however, it will be understood that inventory storage systems of the disclosure can include more than two vertical stacks of storage modules 100. Further, inventory system of the disclosure can include inventory storage modules 100 positioned side-by-side without being arranged in vertical stacks. As shown, each adjacent pair of the inventory storage modules 100 can share one of the shelving systems 106. For example, a first one of the storage modules 100(1) can include first and second shelving systems 106(1) and 106(2), and a second one of the storage modules 100(2) can include the second shelving system 106(2) and a third shelving system 106(3). Thus, one of the shelving systems, such as the second shelving system 106(2), can be shared by the pair of first and second storage modules 100(1) and 100(2). The second shelving system 106(2) can be positioned between the aisle 105 of the first storage module 100(1) and the aisle 105 of the second storage module 105. Thus, each robotic transport system 116 and conveyor 114 of the first storage module 100(1) can be configured to service the second side 110 of the second shelving system 106(2), and each robotic transport system 116 and conveyor 114 of the second storage module 100(2) can be configured to service the first side 108 of the second shelving system 106(2). Each storage module 100(1) and 100(2) can be configured to operate independently of each other storage module 100(1) and 100(2).

The storage system 10 can be configured to transfer storage containers 150 or inventory items between aisles 105 along the lateral direction A through the shelves 112. For example, a robotic manipulator 122 in a first aisle 105 can be configured to push storage containers 150 or inventory items from one side 108 or 110 of a shelf 112 to the other side 108 or 110 of the shelf 112. The storage containers 150 or inventory items can then be accessed by a robotic manipulator 122 of an adjacent aisle 105. To support such embodiments, each shelf 112 that is between the two aisles 105 can be angled downwards towards the first side 108 and angled downwards towards the second side 110, such that the shelf has a peak (not shown) between the first and second sides 108 and 110. In this manner, storage containers 150 or inventory items can be gravity fed from the peak towards the first and second sides 108 and 110.

In an alternative embodiment, one or more aisles 105 of the system 10 can be conveying aisles that include robotic transport system 116 and conveyors 114, and one or more aisles 105 can be transfer aisles that include robotic transport system 116 but are devoid of conveyors 114. Thus, conveying aisles 105 can be configured to convey inventory items along the conveyors 114 between the first and second ends 102 and 104. The transfer aisles 105 can be configured to pass storage containers 150 or inventory items between conveying aisles 105 without conveying inventory items along the conveyors 114 between the first and second ends 102 and 104.

Although not shown, one or more of the shelving systems 106 can include as few as a single shelf 112. The shelf 112 can be configured to support a pallet of inventory items that are not stored in storage containers 150, and the robotic manipulator 122 can be configured to pull the inventory items directly off of the shelf 112. In some embodiments, one or more of the shelving systems 106 can be configured to support at least one pallet, and one or more other shelving systems 106 can be configured to support storage containers 150. Thus, the system 10 can be configurable to accommodate differently sized and shaped inventory items.

Although not shown, the inventory storage system 10 can have the plurality of storage modules 100 and at least one conveyor system (not shown) configured to convey inventory items from processing that is upstream of the storage modules 100 to the first end 102 or from the first end 102 to processing that is downstream of the storage modules 100. Similarly, the storage system 10 can have at least one conveyor system (not shown) configured to convey inventory items from processing that is upstream of the storage modules 100 to the second end 104 or from the second end 104 to processing that is downstream of the storage modules 100.

Figure 4:
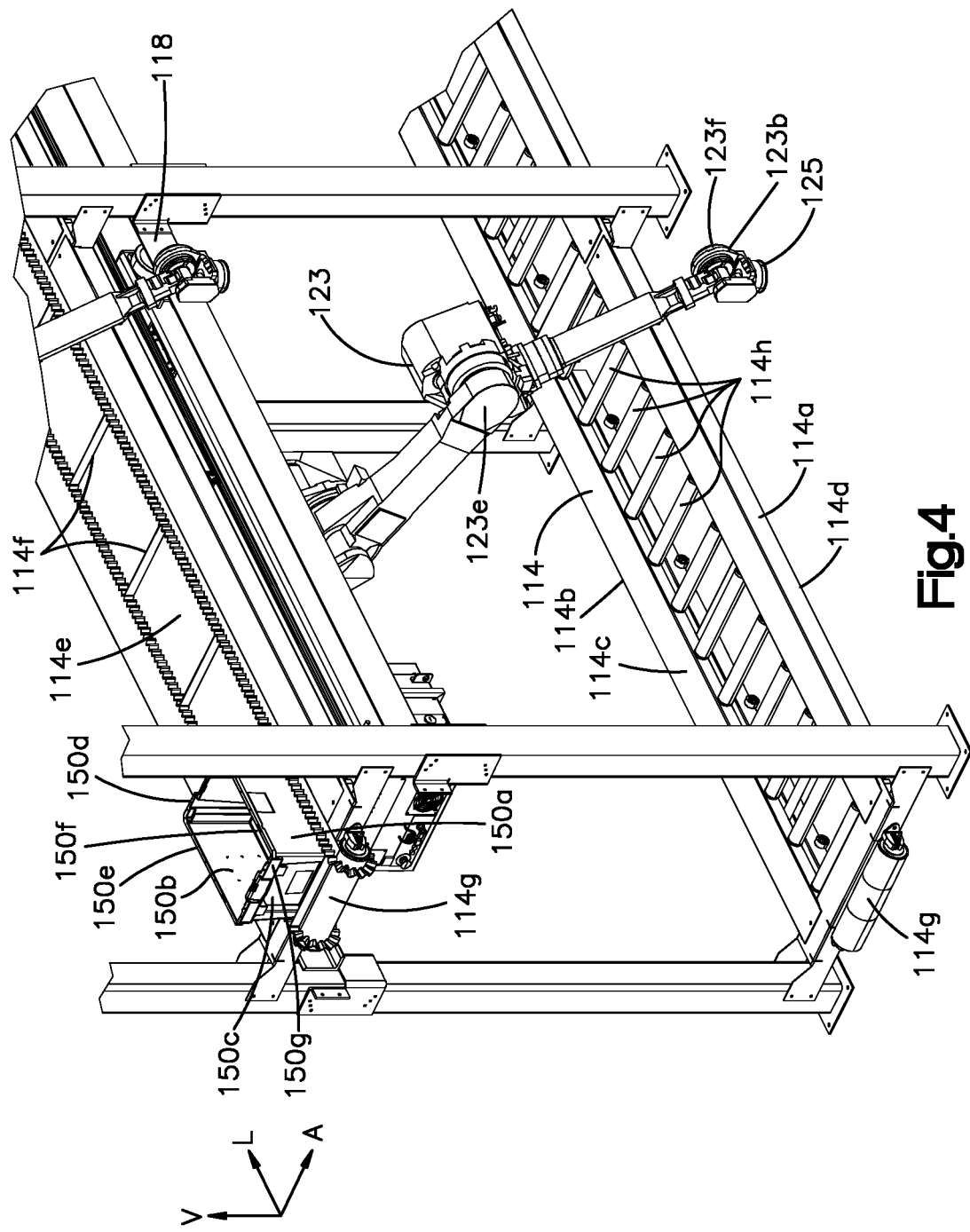
FIG. 4 shows a perspective enlarged view of a portion of the storage system of FIG. 1 with the conveyor belt of the lower conveyor removed.
Figure 8:
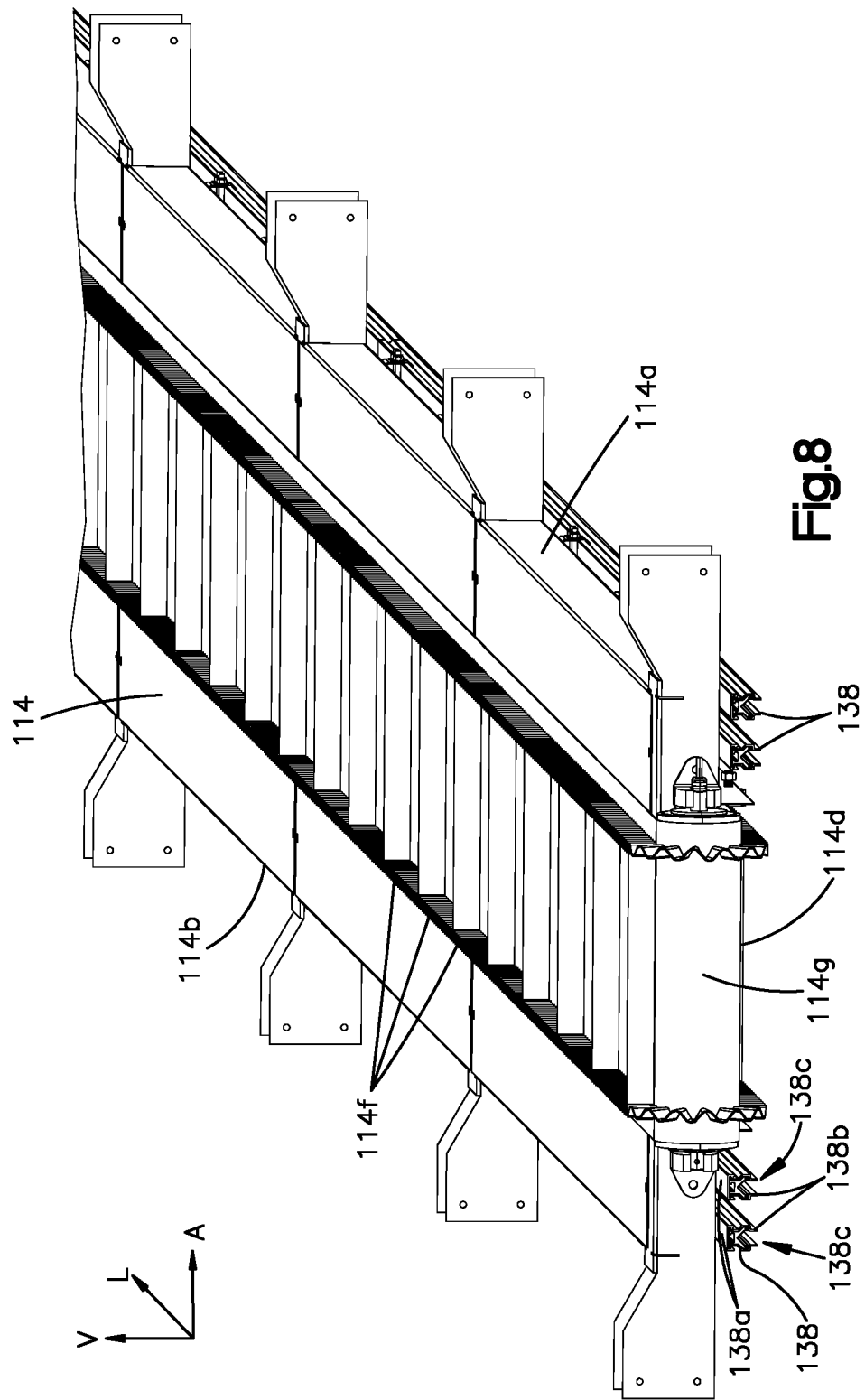
FIG. 8 shows an enlarged perspective view of an end of one of the conveyors of FIG. 1 according to one embodiment.

Referring now more specifically to the enlarged views of FIGS. 4 and 8, each conveyor 114 is configured to convey inventory items between the first and second ends 102 and 104 of the storage module 100 along the longitudinal direction L. In FIG. 4, the belt of the bottom conveyor 114 is removed so that components below the belt can be viewed. Each conveyor 114 has first and second sides 114*a* and 114*b* that are spaced from one another along the lateral direction A. Each conveyor 114 has an upper end 114*c* and a lower end 114*d* that are spaced from one another along the vertical direction V. Each conveyor 114 has a conveying surface 114*e* that is configured to carry inventory items along the longitudinal direction L. Each conveying surface 114*e* can extend between the first and second ends 102 and 104 of the storage module 100 and between the first and second sides 114*a* and 114*b* of the conveyor 114. Each conveying surface 114*e* can be elongate along the longitudinal direction L. Thus, each conveying surface 114*e* can have a length along the longitudinal direction L that is greater than a width of the conveyor surface 114*e* along the lateral direction A.

In general, each conveyor 114 can be implemented using any suitable type of conveyor technology or any combination of suitable technologies. For example, each conveyor segment of the present disclosure can include at least one moving surface, at least one rotating conveyor element, or any combination thereof, where each moving surface or rotating conveyor element at least partially defines the conveyor surface of the conveyor segment. The at least one rotating conveyor element can include at least one powered rotating conveyor element that is configured to rotate in a direction that drives the inventory items to translate along a respective one of the conveyor surfaces. Additionally or alternatively, the at least one rotating conveyor element can include at least one unpowered rotating conveyor element that is configured to rotate in response to an item being translated thereon. Thus, each conveyor 114 can include conveyor elements such as (without limitation) tracks, belts, rollers, skate wheels, balls, any other suitable conveyor elements for translating the inventory items, or any suitable combination of conveyor elements.

In some examples as shown, each conveying surface 114*e* can be configured as a conveyor belt. Further, in some examples, the conveyor belt can include one or more dividers 114*f* that are configured to maintain a separation between adjacent inventory items, although embodiments are not limited to having dividers 114*f*. The dividers 114*f* can be spaced from one another along the longitudinal direction L, and can each extend along the lateral direction A.

In some examples as shown, each conveyor 114 can include at least one powered rotating conveyor element 114*g* that is configured to rotate in a direction that drives the inventory items to move along the longitudinal direction L. The at least one powered rotating conveyor element 114*g* can include powered rotating conveyor elements 114*g* positioned adjacent an end of the conveyor 114 so that they can be easily accessed for repair or replacement. Additionally or alternatively, the at least one powered rotating conveyor element 114*g* can include powered rotating conveyor elements 114*g* positioned between the ends of the conveyor 114.

In some examples, the powered rotating conveyor elements 114*g* can be configured to drive the conveyor surface 114*f* to move. For example, the powered rotating conveyor segments 114*g* can be configured to drive the conveyor surface 114 to rotate along at least one of a first direction (e.g., clockwise) and a second direction (e.g., counter clockwise). In other examples, the conveyors 114 can be devoid of a belt, and the powered rotating conveyor elements 114*g* can define the conveyor surfaces 114*f*. Each powered rotating conveyor element 114*g* can include (without limitation) (i) a motor-driven roller that is driven by a motor that is disposed within the roller such as those made by Interroll, (ii) a chain- or belt-driven roller that is driven by a chain or belt that is in turn driven by a motor that is external to the roller, (iii) any other suitable powered rotating conveyor element, or (iv) any combination thereof.

Additionally or alternatively, each conveyor 114 can include at least one unpowered rotating conveyor element 114*h* that rotates in response to an item being translated thereon. Each unpowered rotating conveyor element 114*g* can include a roller as shown or can include a ball, a skate wheel, any other suitable rotating conveyor element that is configured to roll in response to an object such as the conveyor belt or inventory item being translated thereon, or any combination of such elements. The at least one unpowered rotating conveyor element 114*h* can include a plurality of unpowered rotating conveyor elements that are positioned between the ends of the conveyor 114, such as between a pair of the powered rotating conveyor elements 114*g*.

As described above, each conveyor 114 can be configured to convey the inventory items in storage containers 150. Each storage container 150 can be any suitable storage container configured to carry one or more inventory items therein. Preferably, the inventory storage containers 150 are open-top plastic totes configured to carry items in an e-commerce supply chain. The totes are of a size that an individual person or robot can lift. For example, and with continued reference to FIG. 4, each storage container 150 can be a rectangular structure, such as a bin or tote, formed from a rigid material such as high-density plastic, wood, aluminum, or other suitable material. Each storage container 150 can have a pair of opposed container sidewalls 150a and 150b that are spaced opposite from one another along one of the longitudinal and lateral directions. Each storage container 150 can have a pair of opposed container end walls 150c and 150d that are spaced opposite from one another along another one of the longitudinal and lateral directions. The opposed container end walls 150c and 150d can extend between the opposed container sidewalls 150a and 150b. Similarly, the opposed container sidewalls 150a and 150b can extend between the opposed container end walls 150c and 150d.

Each container 150 has a width Ws from one of the sidewalls 150a and 150b to the other one of the sidewalls 150a and 150b, and can have a length Ls from one of the end walls 150c and 150d to the other one of the end walls 150c and 150d. In some embodiments, the length Ls can be greater than the width Ws. Each storage container 150 can further have an upper end 150e and a bottom surface 150f spaced from one another along the vertical direction V. The bottom surface 150f can extend between the opposed sidewalls 150a and 150b and between the opposed end walls 150c and 150d. The upper end 150e can be open for ease of access in placing inventory items into, and retrieving inventory items from, the storage container 150. Each container 150 can have a height Hs from the upper end 150e to the bottom surface 150f.

The size of a storage container 150 may be selected to optimize storage density of the storage module 100 or other suitable parameter. This may depend on the size and type of items to be stored in the storage container 150. For example, the storage container 150 may have a height of about 18", a width of about 18", and a length of about 24". However, the dimensions of the storage container 150 can be different than those just recited. The items held by the storage container 150 can be any suitable item stored in a material storage facility including, for example, personal electronic devices, computers, recreational equipment, food products, television sets, clothing, household supplies, automotive parts, books, loaded pallets, and any other suitable object capable of being stored.

The storage containers 150 can be stackable on top of one another. For example, the bottom surface 150f of an upper one of the storage containers 150 can be received in the opening of the upper end 150e of a lower one of the storage containers 150. The upper end 150e of the lower storage container 150 can be configured to support the bottom surface 150f of the upper storage container 150 such that the bottom surface 150f of the upper storage container 150 nests inside the opening of the lower storage container 150. Each container 150 can also include at least one protrusion 150g, each extending outwardly from at least one of the container sidewalls and end walls. For example, each container 150 can include a plurality of protrusions 150g, each extending outwardly from at least one of the sidewalls and end walls at a corner of the container 150 adjacent the upper end 150e. At least one protrusion 150g can define a handle that is configured to be configured to be engaged by a human hand for carrying. At least one protrusion 150g can include a lower surface that is configured to be engaged by a tine of an end effector of a robotic manipulator 122, fork lift, or other lifting machine. For example, a storage container 150 can include a pair of the protrusions 150g disposed on opposite sides or ends of the container 150 that are configured to engage a pair of tines.

Each storage container 150 may include an identifier (e.g., bar code, QR code, radio-frequency identification (RFID) tag, and any other suitable identifier). The identifier may be used to uniquely identify the storage container 150. In some examples, the identifier may include non-volatile data storage, which may be associated with the storage container 150 and/or its contents. Data can be read/written to the data storage each time the stackable storage module is accessed. This data may contain status of the stackable storage module, inventory stowed in the stackable storage module, and/or destination information for each storage container 150. In this manner, inventory information may be updated when the identifiers are read.

Figure 7:
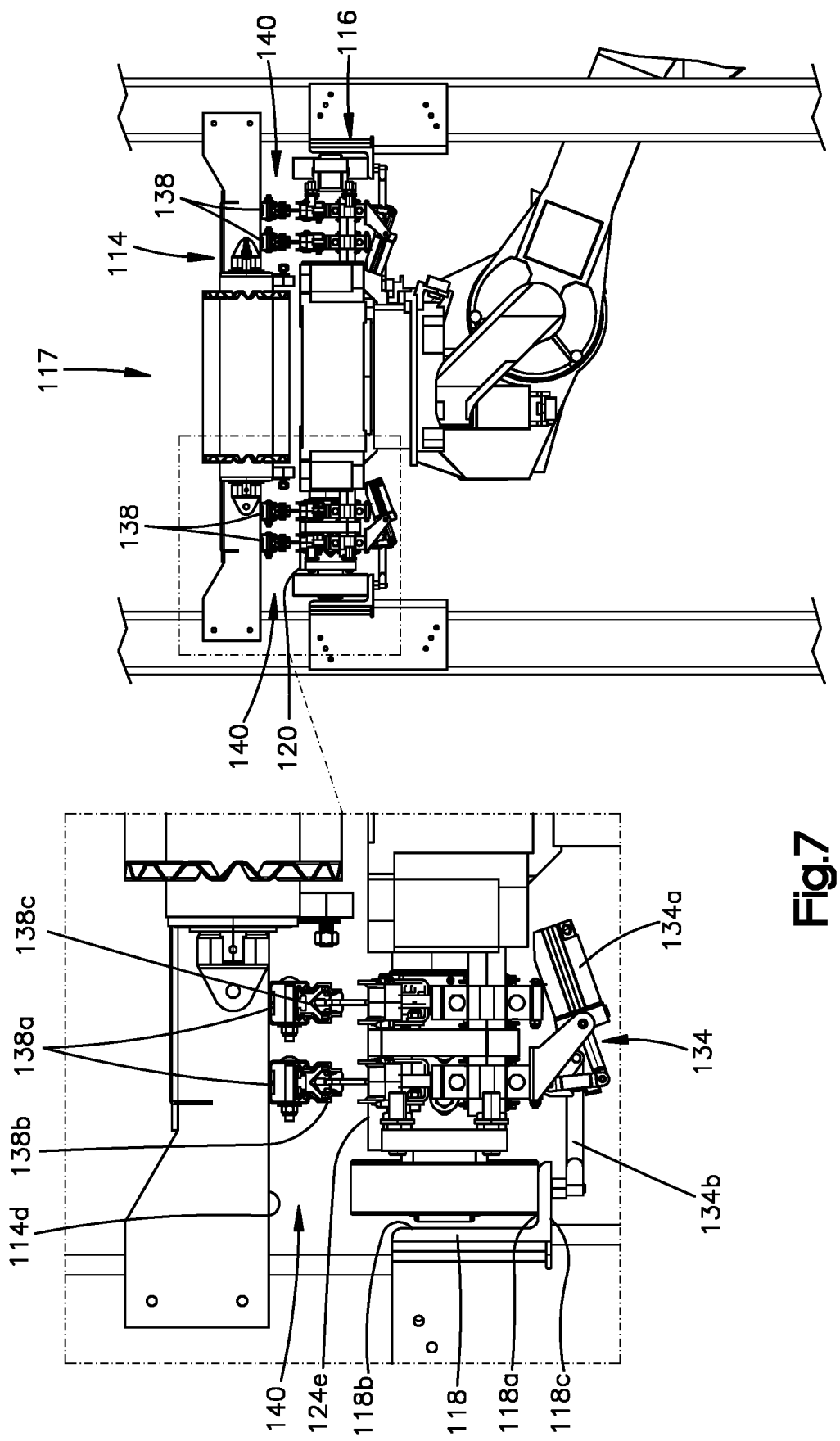
FIG. 7 shows an enlarged end view of a conveyor and robotic transport system of the storage system of FIG. 1 according to one embodiment.

With reference to FIGS. 7 and 8, each storage module 100 can include at least one electrical rail 138 for each robotic transport system 116. Each electrical rail 138 can be configured to carry an electrical current. For example, each storage module 100 can include a plurality of electrical rails 138 for each robotic transport system 116. In FIGS. 7 and 8, four electrical rails 138 are shown, three of which can be configured to communicate power and one of which can be configured as a ground. It will be understood that the electrical rails 138 can be alternatively configured. For example, each storage module 100 can include fewer than or more than four electrical rails 138 for each robotic transport system 116. Additionally or alternatively, fewer than or more than three of the rails 138 can be configured to communicate power. Additionally or alternatively, one or more of the electrical rails 138 can be configured to transmit and/or receive data communications.

Each electrical rail 138 can extend between the first and second ends 102 and 104 of the storage module 100 along the longitudinal direction L. Each electrical rail 138 can be elongate along the longitudinal direction L. Each electrical rail 138 is configured to electrically couple to a power collector 136 of one of the trolleys 120. For example, each electrical rail 138 can define a recess 138c that extends therein so as to receive a projection 136a of a power collector 136 (shown in FIG. 7 and discussed below). In particular, each electrical rail 138 can have a first end 138a and a second end 138b that are spaced from one another along the vertical direction V. The first end 138a can be attached to a respective conveyor 114, such as to the lower end 114d of the respective conveyor 114. The second end 138b can define the recess 138c that is configured to receive the projection 136a of the power collector 136. Thus, the recess 138c can extend into the first end 138a along the vertical direction V. In alternative embodiments, each electrical rail 138 can be implemented in another suitable manner for transferring power to the trolley 120. For example, each rail 138 can be implemented with a lower surface instead of a recess 138c, and the power collector 136 of the trolley 120 can be configured to press against the lower surface. Thus, each rail 138 can be configured to mechanically couple to a respective one of the power collectors 136 through physical contact. However, as described below, each power collector 136 could alternatively receive power via inductive coupling without physical contact between the power collector 136 and rail 138.

As shown in FIGS. 1 and 7, at least some of the storage modules 100 can be stacked on top of one another so as to define a gap 140 between the conveyor 114 of an upper one of the storage modules 100 and the trolley 120 of a lower one of the storage modules that is immediately below the upper one of the storage modules 100 with respect to the vertical direction V. Each electrical rail 138 of the lower one of the storage modules 100 can extend into the gap 140. In some examples, the storage modules 100 can be stacked such that the upper storage module 100 supports the rails 118 of the lower storage module 100. In particular, each rail 138 of the lower storage module 100 can be supported by the lower end 114d of the conveyor 114 of the upper storage module 100. For example, each electrical rail 138 can extend from the lower end 114d into the gap 140. Note, however, that other electrical rails 138, such as the electrical rails 138 corresponding to the upper-most storage module 100 in FIG. 1 (which is not below a conveyor 114), might not be supported by one of the conveyors 114.

Turning now to FIGS. 1, 2, and 4, as described above, each robotic transport system 116 can include a trolley 120 and a track having at least one rail 118. Each rail 118 can be elongate along the longitudinal direction L. In some examples, the track of each robotic transport system 116 can include a pair of rails 118 that are spaced apart from one another along the lateral direction A. Alternatively, each robotic transport system 116 can include just a single rail (i.e., a monorail). As shown in FIG. 7, each rail 118 can have an L-shape in a plane that is perpendicular to the longitudinal direction L. Each rail 118 can include at least one guide surface that is configured to support a rolling element such as a wheel or bearing of the trolley 120. For example, as shown in FIG. 7, each rail 118 can have a horizontal guide surface 118a that extends along the longitudinal and lateral directions. Each rail 118 can optionally have a vertical guide surface 118b that extends along the longitudinal and vertical directions. Each rail 118 can optionally have a surface 118c opposite the horizontal guide surface 118a. In alternative examples, each rail 118 can have another suitable shape such as (without limitation) a C-shape, a U-shape, or a T-shape. Further, in alternative examples, each rail 118 can be configured as a track having a bearing such as a linear bearing or a track having a chain.

Figure 5:
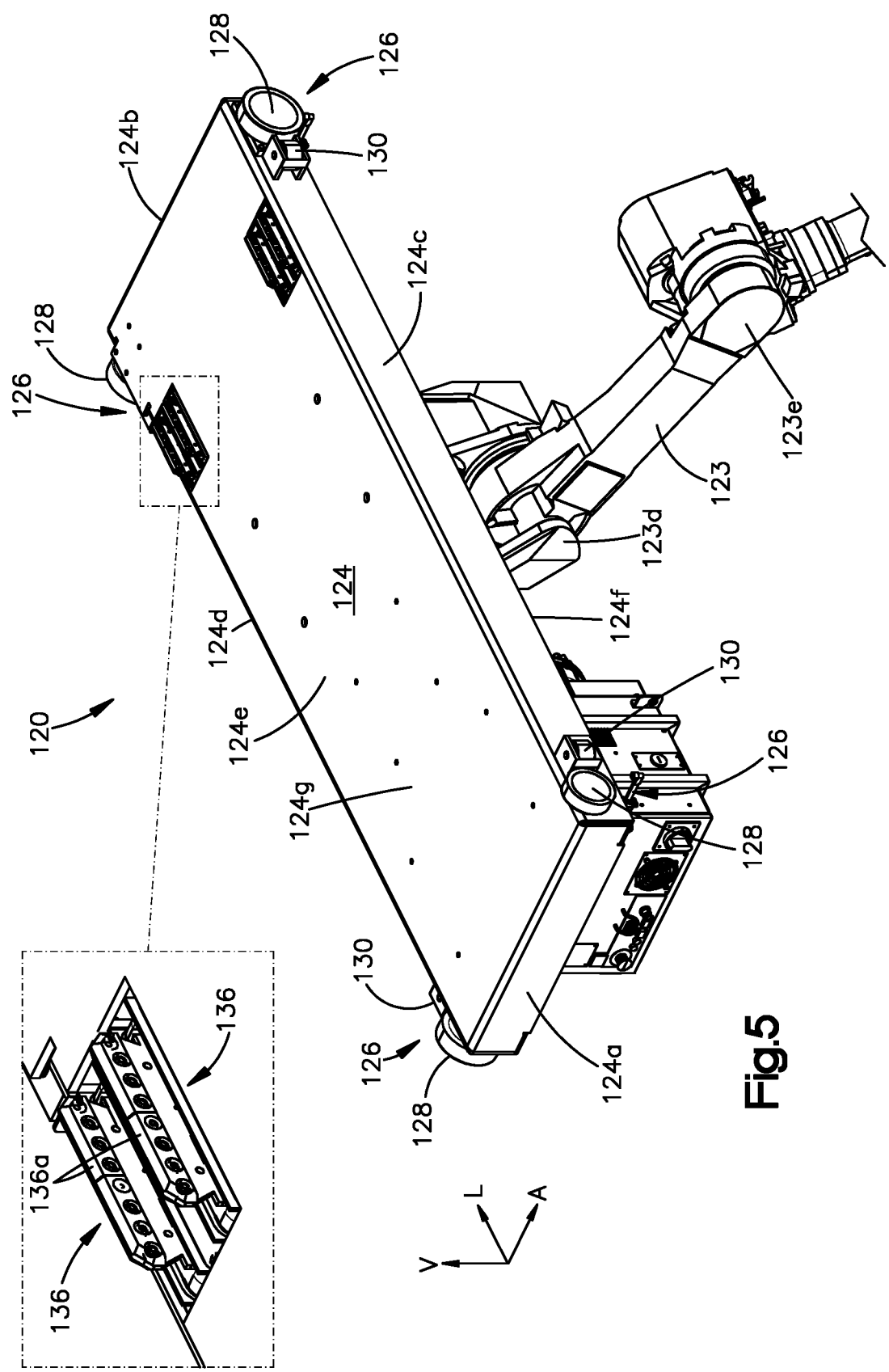
FIG. 5 shows a top perspective view of a trolley and a portion of a robotic manipulator of a storage module of FIG. 1 according to one embodiment.
Figure 6:
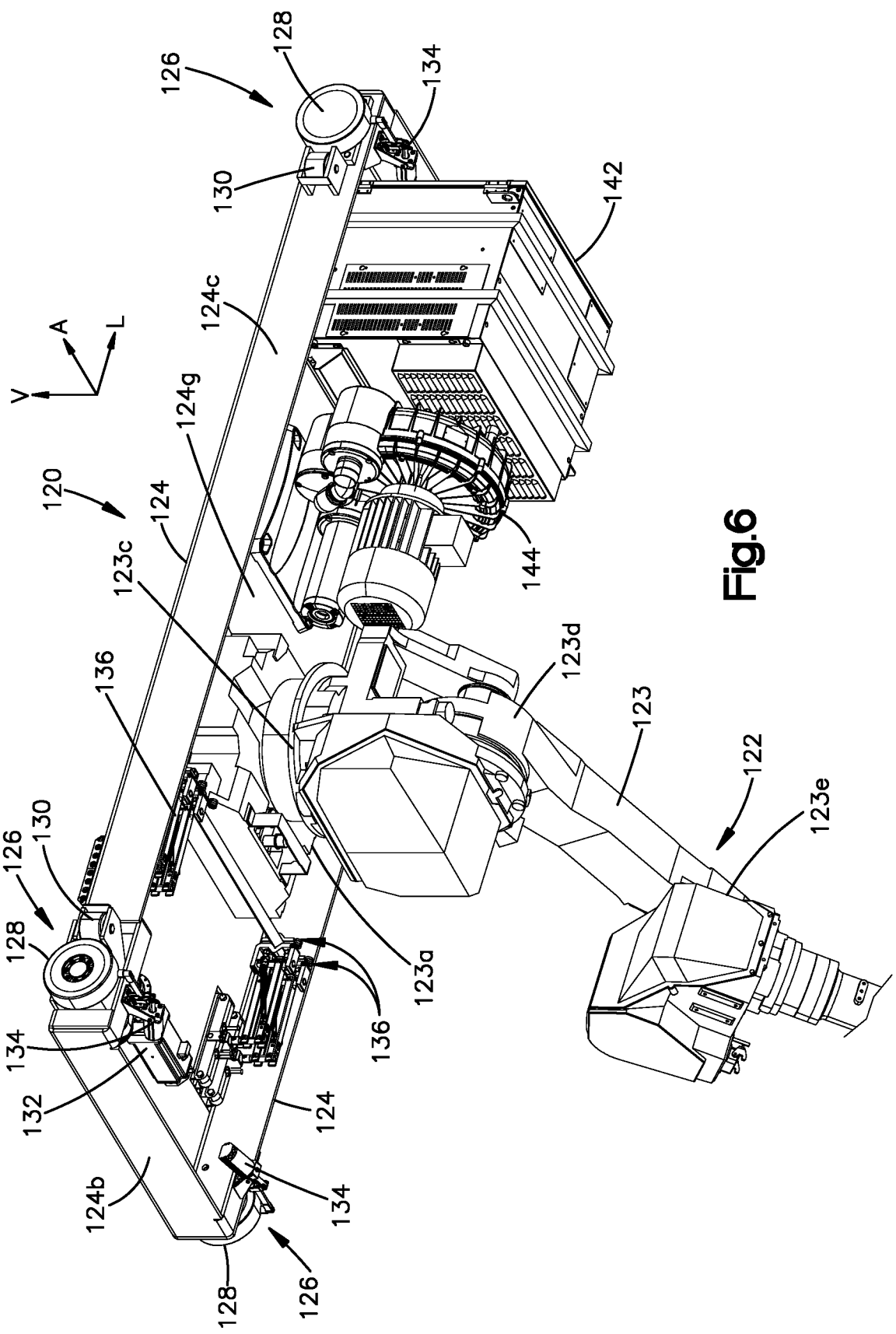
FIG. 6 shows a bottom perspective view of the trolley of FIG. 6 according to one embodiment.

Referring now more specifically to FIGS. 5 to 7, each trolley 120 has a trolley frame 124. The trolley frame 124 has first and second frame ends 124a and 124b that are spaced from one another along the longitudinal direction L. The trolley frame 124 has first and second frame sides 124c and 124d that are spaced from one another along the lateral direction A. The trolley frame 124 has upper and lower frame ends 124e and 124f that are spaced from one another along the vertical direction V. In one example as shown in FIGS. 6 and 7, each trolley 120 can have an upper wall 124g that defines the upper frame end 124e. The upper wall 124g can have an outer surface and an inner surface that are spaced from one another along the vertical direction V.

Each trolley 120 has at least one track engagement feature 126 that is configured to engage the track so that the trolley frame 124 can translate along the track along the longitudinal direction L. Each of the at least one track engagement feature 126 can be disposed at one of the frame sides 124c or 124d or can be disposed at another location of the trolley frame 124. In some examples as shown in FIGS. 5-7, the at least one track engagement feature 126 can include a pair of track engagement features 126 that are spaced from one another along the lateral direction A. For example, the pair can include first and second track engagement features 126 coupled to the trolley frame 124 at the first and second frame sides 124c and 124d, respectively. The first and second track engagement features 126 can be configured to engage the first and second rails 118 of a track, respectively, such that the trolley frame 124 is translatable along the track along the longitudinal direction L. The at least one track engagement feature 126 can additionally include a second pair of track engagement features 126 that are spaced from one another along the lateral direction A and spaced from the pair along the longitudinal direction L. The second pair can include first and second track engagement features 126 coupled to the trolley frame 124 at the first and second frame sides 124c and 124d, respectively. The first and second track engagement features 126 of the second pair can be configured to engage the first and second rails 118 of a track, respectively.

Each track engagement feature 126 can include a wheel 128 as shown in FIGS. 5-7. Each wheel 128 can be configured to rotate around an axis that extends along the lateral direction A. Further, each wheel 128 can be configured to engage the horizontal guide surface 118a of one of the rails 118. However, it will be understood that each track engagement feature 126 can be configured in another manner. For example, each track engagement feature 126 can include an axle (not shown) that is configured to engage a wheel, bearing, or chain of the track. The trolley 120 can include at least one motor 132 supported by the trolley frame 124. Each motor 132 can be configured to cause at least one of the wheels 128 to rotate so as to cause the trolley 120 to move along the track along the longitudinal direction. For example, each motor 132 can drive an axle of one of the wheels 128 to rotate. Each motor 132 can receive power from at least one of the power collectors 136.

Each track engagement feature 126 can include a wheel 130 that is configured to rotate around an axis that extends along the vertical direction V. Each wheel 130 can be configured to engage the vertical guide surface 118b of one of the rails 118. The wheels 130 can maintain positioning of the trolley frame 124 between the rails 118 with respect to the lateral direction L so as to limit skew of the trolley frame 124 and reduce the likelihood of one or more of the wheels 128 becoming disengaged from the rails 118.

Each track engagement feature 126 can additionally or alternatively include a clamp 134 (see e.g., the enlarge view in FIG. 7) that is configured to lock a position of the trolley 120 on the track with respect to movement along the longitudinal direction L. The clamp 134 can also be configured to reduce the likelihood that the trolley 120 tips or rolls over about an axis that extends along the longitudinal direction L due to torque that is placed on the trolley 120 when the robotic arm extends beyond one of the first and second frame sides 124c and 124d with respect to the lateral direction A. The clamp 134 can be an powered toggle clamp such as (without limitation) a pneumatic toggle clamp manufactured by Destaco. The clamp 134 can receive power from the at least one power collector 136. The clamp 134 can include an actuator 134a and an arm 134b that is coupled to the actuator 134a. The actuator 134a can be configured to cause the arm 134b to move between a clamped position, wherein the arm 134 applies a pressure to one of the rails 118 so as to lock the position of the trolley 120, and a released position, wherein the pressure applied by the arm 134 to the rail 118 is at least partially removed so as to allow the trolley 120 to move along the rail 118.

The actuator 134a can be configured to move the arm 134b along the vertical direction V towards a respective one of the rails 118 such that the arm 134b engages the rail 118 in the clamped position and clamps or squeezes the rail between the arm 134b and one of the wheels 128 as shown in FIG. 7. The actuator 134a can also be configured to move the arm 134b along the vertical direction V away from the respective one of the rails 118 such that the arm 134b at least partially releases pressure on the rail 118 in the released position, thereby allowing the rail 118 to pass between the arm 134b and the wheel 128 as the trolley 120 moves along the longitudinal direction L.

Referring to FIGS. 5 and 7, each trolley 120 can include at least one power collector 136, each being configured to electrically couple to a respective one of the electrical rails 138. Thus, each power collector 136 can be configured to receive an electrical current from a respective one of the electrical rails 138. For example, each trolley 120 can include a plurality of power collectors 136. In FIGS. 5 and 7, four power collectors 136 are shown, three of which can be configured to receive power and one of which can be configured as a ground. The power collectors can be configured to supply the power that it receives to at least one, up to all, of (i) a controller 136, (ii) a motor 132, (iii) a clamp 134, (iv) a robotic arm 123, and (v) an end effector 125. It will be understood that the power collectors 136 can be alternatively configured. For example, each trolley 120 can include fewer than or more than four power collectors 136. Additionally or alternatively, fewer than or more than three of the power collectors 136 can be configured to communicate power. Additionally or alternatively, one or more of the power collectors 136 can be configured to transmit and/or receive data communications.

Each power collector 136 can include at least one projection 136a that is configured to be received in a recess 138c of one of the rails 138. Each projection 136a can extend from the upper frame end 124e of the trolley frame 120, such as from the outer surface of the upper wall 124g of the trolley frame 124. Each projection 136a can have a length along the longitudinal direction L that is greater than a width of the projection 136a along the lateral direction A. Each projection 136a can have a height along the vertical direction V that is less than the length. Thus, each projection 136a can be elongate along the longitudinal direction L. It will be understood that the power collectors 136 can be configured in any suitably alternative manner. For example, each projection 136a can have another suitable shape such as a leaf spring that is configured to press against a surface of one of the rails 138, rather than be received in the recess 138c of one of the rails 138. Thus, it can be said that each power collector 136 is configured to mechanically couple to a respective one of the rails 138. However, in alternative embodiments, each power collector can electrically couple to one of the rails 138 or other power source without mechanically coupling to the rail. For example, each power collector can inductively couple to a power source that is stationary relative to the trolley. In such a case, each power collector and each power source can include an inductive coil.

With continued reference to FIG. 7, the storage system 10 can include at least one inventory transfer system 117 that includes a conveyor 114, and a robotic transport system 116 disposed below the conveyor 114 along the vertical direction V. The conveyor 114 can be a conveyor of an upper one of the storage modules 100, and the robotic transport system 116 can be the robotic transport system of a lower one of the storage modules 100 immediately below the upper storage module 100. Each inventory transfer system 117 can define a gap 140 between the conveyor 114 and the trolley 120 of the robotic transport system 116. For example, the gap can be defined between the upper frame end 124e of the trolley 120 and the lower end 114d of the conveyor 114, such as between the outer surface of the upper wall 124g, the upper frame end 124e and the lower end 114d of the conveyor 114. The gap 140 can have a height along the vertical direction V. The height can be inversely proportional to a storage density of the storage module 100. For example, a smaller height can enable a larger storage density than a larger height. Therefore, preferably, the height of the gap 140 is preferably relatively small. In one example, the height can be substantially equal to a combined height of one of the rails 138 and one of the power collectors 136 when they are mated to one another. In another example, the height can be in a range from about $\frac{1}{8}$" to about 6".

Referring now more specifically to FIG. 6, each trolley 120 can include a robotic manipulator 122 that is supported by the trolley frame 124. The robotic manipulator 122 can include a robotic arm 123 and an end effector 125 (labeled in FIG. 4). The robotic manipulator 122 can receive power from the at least one power collector 136. The robotic arm 123 can have a first arm end 123a and a second arm end 123b that are spaced from one another. The first arm end 123a can be attached to the trolley frame 124 between the first and second frame sides 124c and 124d and between the first and second frame ends 124a and 124b. The robotic arm 123 can extend below the trolley frame 124 with respect to the vertical direction V. The first arm end 123a can be attached to the trolley frame 124, such as to the inner surface of the upper wall 124g. The track engagement features 126 can be outwardly spaced from the first arm end 123a with respect to the longitudinal direction L. For example, the first arm end 123a can be attached to the trolley frame 124 between (i) a first pair of track engagement features 126 that are spaced from one another along the lateral direction A, and (ii) a second pair of track engagement features 126 that are spaced from one another along the lateral direction A and spaced from the first pair of track engagement features with respect to the longitudinal direction A.

The robotic arm 123 can have a plurality of joints (e.g., 123c, 123d, 123e, and 123f) that are configured to allow the robotic arm 123 to articulate. For example, the robotic arm 123 can have a joint 123c that is configured to rotate the robotic arm 123 relative to the trolley frame 124 about an axis that extends along the vertical direction V. The joint 123c can be positioned adjacent the first arm end 123a. Additionally or alternatively, the robotic arm 123 can have at least one elbow joint 123d, 123e, and 123f that is configured to allow different portions of the robotic arm 123 to rotate about a horizontal axis relative to one another and/or to allow the end effector 125 to rotate about a horizontal axis relative to the second arm end 123b. It will be understood that the robotic arm could be configured in any suitable alternative manner.

The end effector 125 can be coupled to the second arm end 123b. The end effector 125 is configured to removeably couple an inventory item to the robotic arm 123. In one example, the end effector 125 can be a vacuum end effector that grasps objects using suction. In such embodiments, the trolley 120 can include a vacuum generator 144 that is configured to produce the suction at the end effector 125. The vacuum generator 144 can receive power from the at least one power collector 136. The vacuum generator 144 can be attached to the trolley frame 124, such as to the inner surface of the upper wall 124g. The vacuum generator 144 can be outwardly spaced from the first arm end 123a of the robotic manipulator with respect to the longitudinal direction L. The vacuum generator 144 can receive power from the at least one power collector 136.

It will be understood that different end effectors may be employed depending on the application for the robotic manipulator 122. For example, categories of end effectors that can be employed include (without limitation): soft robotic end effectors, electro-adhesion end effectors, and mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferro-magnetic particles capable of altering a size or shape of the fluid volume when subjected to a magnetic field). Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

Each robotic manipulator 122 can be configured to perform at least one, up to all, of (i) removing storage containers 150 from the shelving systems 106, (ii) retrieving inventory items from the storage containers 150, (iii) stowing inventory items into the storage containers 150, and (iv) stowing the storage containers 150 onto the shelving systems 106. Each robotic manipulator 122 can be any suitable material handling robot. Each robotic manipulator 122 may include any suitable type and number of sensors disposed throughout the robotic manipulator (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator, and an end effector.

The sensors may be in communication with a controller 142 that is local to the trolley 120 and/or may be in direct communication with a controller 160 (see FIG. 1) that is external to the trolley 120. In this manner, the controller or controllers may control the operation of the robotic manipulator 122 and the end effector 125 based at least in part on sensing information received from the sensors. The sensors may include any suitable combination of sensors capable of detecting depth of objects, capturing RGB and other images of objects, scanning machine-readable information, capturing thermal images, detecting position and orientation of objects, and performing any other suitable sensing as described herein.

With continued reference to FIG. 6, each trolley 120 can include a controller 142 that is supported by the trolley frame 124. The controller 142 can be attached to the trolley frame 124, such as to the inner surface of the upper wall 124g. The controller 142 can be disposed outwardly from the first arm end 123a of robotic manipulator 122 with respect to the longitudinal direction A. The controller 142 can receive power from the at least one power collector 136. The controller 142 may include any suitable control circuitry capable of receiving, processing, executing, and generating instructions relating to the operation of at least one, up to all, of (i) the motor 132, (ii) the clamp 134, (iii) the robotic arm 123, and (iv) the end effector 125. For example, the controller 142 can be configured to control the robotic manipulator 122 so as to move the end effector 125 to an inventory item that is disposed outwardly of one of the first and second frame sides 124c and 124d with respect to the lateral direction A and to couple the inventory item to the robotic arm 123. As another example, the controller 142 can be configured to driving the at least one motor 132 to cause the trolley 120 to move along the track to a desired position. As yet another example, the controller 142 can be configured to move the clamp 134 between the clamped and released positions.

Referring back to FIG. 1, the aisle 105 occupies space that could otherwise be used for storing inventory items. The width of the aisle 105 along the lateral direction A is preferably designed to be as small as possible, while being large enough for inventory items and storage containers 150 to be conveyed along the aisle. Therefore, the width of the aisle 105 along the lateral direction A is preferably close to the width of the storage containers 150 so as to limit the amount of aisle space that could otherwise be used for storage. The aisle width can be dependent upon a width of each trolley 120 along the lateral direction A. The width of each trolley 120 can be kept relatively small by spacing at least one, up to all, of the controller 142, the vacuum generator 144, the at least one motor 132, the at least one power collector 136, and the at least one track engagement feature 126 outwardly from the first arm end 123a of the robotic manipulator 122 with respect to the longitudinal direction L. Thus, some, up to all, of the electrical components of the trolley 120, except for the robotic manipulator 122, can be disposed outwardly of the robotic manipulator 122 with respect to the longitudinal direction L. In contrast, spacing these components outwardly from the first arm end 123a along the lateral direction A would increase the width of the trolley 120, and consequently, the width of the aisle 105.

Figure 9:
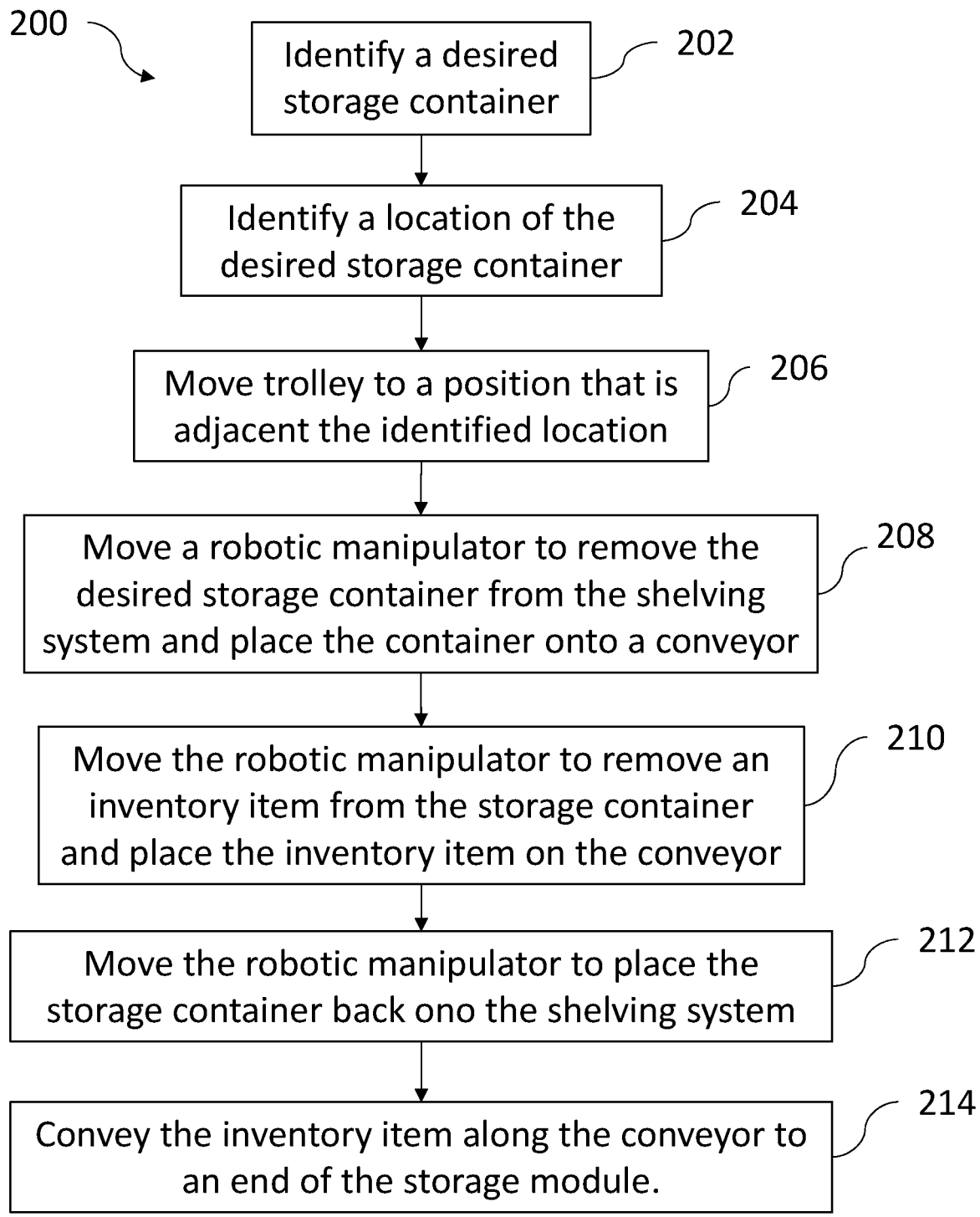
FIG. 9 shows a simplified flow diagram of a method of operating the storage system of FIG. 1 according to one embodiment.

Turning now to FIGS. 1 and 9, a method 200 of retrieving an inventory item from a storage system such as the system 10 of FIG. 1 is shown. In step 202, the method comprises causing a desired storage container 150 to be identified from a plurality of storage containers 150 supported by the inventory storage system 10, where each storage container 150 is configured to store at least one inventory item therein. In step 204, the method comprises causing a location of the desired storage container 150 within a select storage module 100 of the inventory storage system 10 to be identified by identifying a select shelf 112 of a shelving system 106 of the select storage module 100 that supports the desired storage container 150 from a plurality of shelves 112 of the shelving system 106 that are spaced from one another along the vertical direction V.

In step 206, the method comprises causing a trolley 120 of the select storage module 100 that supports a robotic manipulator 122 to move along a track along the longitudinal direction L to a position that is adjacent the location of the desired storage container 150, where the track is positioned alongside the shelving system 106 with respect to the lateral direction L. Step 206 can optionally include causing the location of the desired storage container 150 on the select shelf 112 to be identified from a plurality of longitudinal storage positions on the select shelf 112 that are offset from one another along the longitudinal direction L. Further, in embodiments that employ a plurality of storage modules 100, step 206 can include causing the select storage module 100 that stores the desired storage container 150 to be identified from a plurality of storage modules 100 of the inventory storage system 10, where each storage module 100 includes at least one shelving system 106, a robotic transport system 116 having a track and a trolley 120 that moves along the track, and a robotic manipulator 122 supported by the trolley 120. In particular, the select storage module 100 can be identified from a plurality of storage modules 100 that are stacked on top of one another along the vertical direction V and/or arranged side-by-side along the lateral direction L.

In step 208, the method comprises causing the robotic manipulator 122 of the trolley 120 to remove the desired storage container 150 from the shelving system 106 and place the desired storage container 150 onto a conveyor 114 of the select storage module 100 that is disposed below the trolley 120. Step 208 can include causing the robotic manipulator 122 to move an end effector 125 of the robotic manipulator 122 to the desired storage container 150, and to removeably couple the robotic manipulator 122 to the desired storage container 150. Step 208 can further include causing the robotic manipulator 122 to move the desired storage container 150 to the conveyor 114, and to decouple the robotic manipulator 122 from the desired storage container 150.

In step 210, the method can include causing the robotic manipulator 122 to remove an inventory item from the desired storage container 150 when the desired storage container 150 is positioned on the conveyor 114, and place the inventory item onto the conveyor 114. In step 212, the method can comprise causing the robotic manipulator 122 to place the desired storage container 150 back onto the shelving system 106 after placing the inventory item on the conveyor 114. Step 212 can include causing the end effector 125 to removeably couple the robotic manipulator 122 to the desired storage container 150, and to move the desired storage container 150 to the shelving system 106. In step 214, the method can comprise causing the conveyor 114 to move the inventory item along the longitudinal direction L to an end of the inventory storage module 100. Note that, in alternative embodiments or in some iterations of the method, steps 210 and 212 can be omitted, and step 214 can comprise causing the conveyor 114 to move the desired storage container 150 that carries the inventory item to move the storage container 150 along the longitudinal direction L to an end of the inventory storage module 100. Further, in alternative embodiments or in some iterations of the method, the robotic manipulator 122 can grasp inventory items directly from the shelfing system 106 without grasping storage containers 150 carrying the inventory items, and then can place the inventory items onto the conveyor 114 without placing storage containers 150 on the conveyor 114.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. An inventory storage system, comprising:
   a first end and a second end that are spaced from one another along a longitudinal direction; and
   at least one storage module, each comprising:
      at least one shelving system that extends between the first and second ends along the longitudinal direction, each shelving system having first and second sides that are spaced from one another along a lateral direction, perpendicular to the longitudinal direction, and having at least one shelf that defines a plurality of inventory storage locations;
      a conveyor that is positioned alongside one of the first and second sides of each shelving system, the conveyor being configured to convey inventory items along the longitudinal direction between the first and second ends; and
      a robotic transport system positioned alongside the one of the first and second sides of each shelving system and spaced above the conveyor along a vertical direction, the robotic transport system having a track that is fixed relative to the at least one shelving system and the conveyor with respect to movement along the vertical direction, and the robotic transport system having a trolley configured to translate along the track along the longitudinal direction, the trolley including a robotic manipulator,
      wherein the trolley is configured to move the robotic manipulator along the track to a position that is adjacent a select one of the inventory storage locations, and the robotic manipulator is configured to move an inventory item from at least one of (1) the conveyor to the select one of the inventory storage locations and (2) the select one of the inventory storage locations to the conveyor.

2. The inventory storage system of claim 1, wherein the robotic manipulator is configured to move a storage container carrying the inventory item from the select one of the inventory storage locations to the conveyor, and is configured to remove the inventory item from the storage container and place the inventory item onto the conveyor.

3. The inventory storage system of claim 1, wherein the at least one shelving system comprises a pair of shelving systems that are spaced from one another along the lateral direction, and the conveyor and robotic transport system are disposed between the shelving systems of the pair.

4. The inventory storage system of claim 1, wherein the at least one storage module comprises a plurality of the storage modules that are positioned side-by-side along the lateral direction.

5. The inventory storage system of claim 4, wherein each adjacent pair of the storage modules share one of the shelving systems such that the one of the shelving systems is between the conveyors of the storage modules of the pair and between the robotic transport systems of the pair.

6. The inventory storage system of claim 1, wherein:

each track includes a pair of rails that are spaced apart from one another along the lateral direction, and each rail is elongate along the longitudinal direction; and each trolley has a trolley frame that supports the robotic arm such that the robotic arm extends below the trolley frame with respect to the vertical direction.

7. The inventory storage system of claim 6, wherein the system includes at least one electrical rail that extends along the longitudinal direction, and the at least one trolley includes at least one power collector that is configured to electrically couple to the electrical rail so as to provide power to the robotic manipulator.

8. The inventory storage system of claim 6, wherein the at least one storage module includes an upper storage module and a lower storage module, and wherein the conveyor of the upper storage module is spaced from the trolley of the lower storage module so as to define a gap, wherein the gap has a height that is substantially equal to a combined height of one of the at least one electrical rail and the at least one power collector when mated to one another.

9. An inventory storage system, comprising:
a first end and a second end that are spaced from one another along a longitudinal direction; and
a plurality of storage modules stacked on top of one another along the vertical direction, each comprising:
at least one shelving system that extends between the first and second ends along the longitudinal direction, each shelving system having first and second sides that are spaced from one another along a lateral direction, perpendicular to the longitudinal direction, and having at least one shelf that defines a plurality of inventory storage locations;
a conveyor that is positioned alongside one of the first and second sides of each shelving system, the conveyor being configured to convey inventory items along the longitudinal direction between the first and second ends; and
a robotic transport system positioned alongside the one of the first and second sides of each shelving system and spaced above the conveyor along a vertical direction, the robotic transport system having a track, and a trolley configured to translate along the track along the longitudinal direction, the trolley including a robotic manipulator,
wherein the trolley is configured to move the robotic manipulator along the track to a position that is adjacent a select one of the inventory storage locations, and the robotic manipulator is configured to move an inventory item from at least one of (1) the conveyor to the select one of the inventory storage locations and (2) the select one of the inventory storage locations to the conveyor.

10. The inventory storage system of claim 9, wherein each of the storage modules is configured to service its at least one shelving system independently of the other storage modules servicing their respective shelving systems.

11. The inventory storage system of claim 9, wherein the at least one storage module comprises a plurality of the storage modules that are positioned side-by-side along the lateral direction.

* * * * *